United States Patent [19]

Sakano et al.

[11] Patent Number: 4,490,506

[45] Date of Patent: Dec. 25, 1984

[54] THERMOPLASTIC RESIN COMPOSITION

[75] Inventors: Hajime Sakano, Hirakata; Akitoshi Ito, Mie; Motoichi Yano, Osaka; Yasuhiro Honda, Toyonaka, all of Japan

[73] Assignee: Sumitomo Naugatuck Co. Ltd., Japan

[21] Appl. No.: 539,787

[22] Filed: Oct. 7, 1983

[30] Foreign Application Priority Data

Oct. 7, 1982 [JP] Japan ................. 57-177375

[51] Int. Cl.$^3$ ............... C08L 51/04; C08L 55/02; C08L 69/00
[52] U.S. Cl. ..................... 525/67; 525/84; 525/86; 525/148; 525/316
[58] Field of Search ............ 525/67, 316, 84, 86, 525/148

[56] References Cited

U.S. PATENT DOCUMENTS

| | | | |
|---|---|---|---|
| 3,813,358 | 5/1974 | O'Connell | 525/67 |
| 3,947,524 | 3/1976 | Hozumi et al. | 525/67 |
| 4,205,140 | 5/1980 | Liebig et al. | 525/67 |
| 4,243,764 | 1/1981 | Rudd | 525/67 |

*Primary Examiner*—Allan M. Lieberman
*Attorney, Agent, or Firm*—Jones, Tullar & Cooper

[57] ABSTRACT

A thermoplastic resin composition excellent in impact resistance and moldability and improved in falling ball impact strength at a weld part which comprises (A) a polycarbonate resin having a reduced viscosity at 25° C. in chloroform of 0.40 to 0.55 and (B) a diene-rubber modified resin comprising 10 to 100% by weight of a graft polymer of a diene rubber chosen from polybutadiene, styrene/butadiene copolymer and butadiene-acrylonitrile copolymer, with an aromatic vinyl compound and at least one of a vinyl cyanide and an alkyl unsaturated carboxylate grafted thereon and 90 to 0% by weight of a copolymer of an aromatic vinyl compound with at least one of a vinyl cyanide and an alkyl unsaturated carboxylate. The diene-rubber modified resin has apparent melt viscosities at 250° C. of $5 \times 10^3$ to $1 \times 10^5$ poise at a shear rate of $10^2$ sec$^{-1}$ and of $1.5 \times 10^3$ to $1 \times 10^4$ poise at a shear rate of $10^3$ sec$^{-1}$, the weight proportion of the components (A) and (B) being from 20:80 to 80:20.

2 Claims, No Drawings

THERMOPLASTIC RESIN COMPOSITION

The present invention relates to a thermoplastic resin composition. More particularly, it relates to a thermoplastic resin composition comprising a polycarbonate resin and an ABS resin having excellent physical properties such as impact resistance and moldability and being improved particularly in falling ball impact strength at a weld part.

Polycarbonate resins have excellent physical properties, particularly high impact resistance, and are known as "engineering plastics". It is also known to blend various resins into polycarbonate resins for enhancing the physical properties of polycarbonate resins with improvement of their deteriorated properties. For instance, incorporation of diene rubber graft copolymers such as ABS resins (acrylonitrile-butadiene-styrene copolymer) or MBS resins (methyl methacrylate-butadiene-styrene copolymer) into polycarbonate resins is effective in improving moldability and reducing the thickness dependency of impact resistance (Japanese Patent Publns. (examined) Nos. 15225/1963, 71/1964, 11496/1967 and 11142/1976).

In general, these conventional thermoplastic resin compositions show improvement of apparent moldability, for instance, of a flow amount from a Koka-type flow tester. They also show improvement of impact resistance and heat resistance in comparison with ABS resins. Since, however, their impact resistance has usually been evaluated on the so-called Izod impact strength test with or without notch which is suitable for a non-weld part, as the improvement of impact resistance in them is assured at a non-weld part but not as a weld part.

In injection molding which is the most popular molding procedure, the number of gates and the flow state of resin are required to be changed depending upon the form and size of a molding product. Because of this reason, there is unavoidably produced the crossing of resin flows in different directions, from which a weld part is formed. The weld part of a molded product is usually much more fragile than the non-weld part, and this tendency is greater in a molded product of larger size.

As stated above, conventional thermoplastic resin compositions comprising polycarbonate resins and diene rubber graft copolymers can afford molded products having satisfactory impact strength at the non-weld part. However, their falling ball impact strength at the weld part is not sufficiently high and can not usually exceed a value of 50 kg.cm in falling ball impact strength. For instance, actual measurement on "Bayblend" (manufactured by Bayer) and "Cycoloy" (manufactured by Borg Warner) revealed that their falling ball impact strength is around 20 kg.cm. Thus, conventional thermoplastic resin compositions may not be satisfactory for manufacture of molded products of large size having a weld part. Although the improvement of the tensile strength at a weld part by regulating the chemical structure of the ABS resin to be incorporated into a polycarbonate resin is proposed (German Offenlegungsschrift No. 2,259,565), the falling ball impact strength of the resulting thermoplastic resin composition is still at the same level as that of conventional thermoplastic resin compositions.

As a result of an extensive study, it has now been found that blending of a polycarbonate resin having a specific reduced viscosity with an diene-rubber modified resin having certain melt viscosity characteristics can provide a thermoplastic resin composition highly enhanced in falling ball impact strength.

According to this invention, there is provided a thermoplastic resin composition excellent in impact resistance and moldability and improved in impact strength at a weld part which comprises (A) a polycarbonate resin having a reduced viscosity in chloroform at 25° C. of 0.40 to 0.55 and (B) a diene-rubber modified resin comprising 10 to 100% by weight of a graft polymer of a diene rubber with a aromatic vinyl compound and at least one of a vinyl cyanide and an alkyl unsaturated carboxylate grafted thereon and 90 to 0% by weight of a copolymer of an aromatic vinyl compound with at least one of a vinyl cyanide and an alkyl unsaturated carboxylate and having apparent melt viscosities at 250° C. of $5 \times 10^3$ to $1 \times 10^5$ poise at a shear rate of $10^2$ sec$^{-1}$ and of $1.5 \times 10^3$ to $1 \times 10^4$ poise at a shear rate of $10^3$ sec$^{-1}$, the weight proportion of the components (A) and (B) being from 20:80 to 80:20.

The thermoplastic resin composition of the invention has usually 100 kg.cm or more in falling ball impact strength.

As the polycarbonate resin (A), there are exemplified aromatic polycarbonates, aliphatic polycarbonates, aliphatic-aromatic polycarbonates, etc. for example, polymers and copolymers of bisphenols such as 2,2 -bis(4-hydroxyphenyl)alkanes, bis(4-hydroxyphenyl)ethers, bis(4-hydroxyphenyl)sulfones, bis(4-hydroxyphenyl)sulfides and bis(4-hydroxyphenyl)sulfoxides, etc. and/or halogenated bisphenols may be employed. Typical examples of the polycarbonate resin and their production are described in various textbooks and literatures including Encyclopedia of Polymer Science and Technology, Vol. 10, pages 710 to 764 (1969). Among them, preferred is a non-halogenated polycarbonate comprising units of the group of the formula:

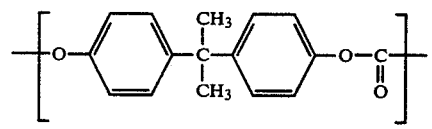

and having a molecular weight of 15,000 to 30,000.

The polycarbonate resin (A) to be used in this invention is required to have a reduced viscosity at 25° C. in chloroform of 0.40 to 0.55. When the reduced viscosity is less than 0.40, the impact resistance and the falling ball impact strength at the weld part of the resulting thermoplastic resin composition are inferior. When more than 0.55, the moldability as well as the falling ball impact strength at the weld part are poor. The polycarbonate resin (A) having the desired reduced viscosity can be produced by a conventional procedure with selection of an appropriate composition of the monomeric components and appropriate polymerization conditions.

The reduced viscosity can be determined by the use of an Ostwald viscometer according to the following equation:

η (Reduced viscosity) = ηsp/C
ηsp (Relative viscosity): T/To−1
T: flowing time of test solution
To: flowing time of chloroform C (Concentration): 0.4 g polycarbonate/100 ml chloroform The diene-rubber modified resin (B) to be used in the invention comprises a graft polymer obtainable by polymerizing a diene rubber with an aromatic vinyl compound and at least one of a vinyl cyanide and an alkyl unsaturated carboxylate. The weight proportion of the diene rubber and the monomeric components is preferred to be 5:95 to 70:30, although no particular limitation is present. The composition of the monomeric components is also not limitative and may comprise, for instance, an aromatic vinyl compound(s) in a content of 50 to 80% by weight and a vinyl cyanide(s) and/or an alkyl unsaturated carboxylate(s) in a content of 50 to 20% by weight on the basis of the total weight of the monomeric components.

In addition to the graft polymer, the diene-rubber modified resin (B) can optionally comprise a copolymer obtainable by polymerizing an aromatic vinyl compound(s) with a vinyl cyanide(s) and/or an alkyl unsaturated carboxylate(s). The composition of the monomeric components is not limitative and may comprise, for instance, an aromatic vinyl compound(s) in a content of 40 to 85% by weight and a vinyl cyanide(s) and/or an alkyl of unsaturated carboxylate(s) in a content of 60 to 15% by weight. When the copolymer is a copolymer of an aromatic vinyl compound and a vinyl cyanide, it is preferred to have an inherent viscosity at 30° C. in dimethylformamide of 0.50 to 1.10 for assuring a favorable falling ball impact strength at the weld part and moldability. More particularly, the use of a copolymer having an inherent viscosity of 0.90 to 1.10 provides further improvement in this direction.

Examples of the diene rubber for the graft polymer are polybutadiene, styrene/butadiene copolymer, butadiene acrylonitrile copolymer, etc. Examples of the aromatic vinyl compound(s) are styrene, alpha-methylstyrene, dimethylstyrene, vinyltoluene, etc. Examples of the vinyl cyanide(s) are acrylonitrile, methacrylonitrile, etc. Examples of the alkyl of unsaturated carboxylic acid(s) are methyl acrylate, ethyl acrylate, butyl acrylate, methyl methacrylate, ethyl methacrylate, butyl methacrylate, hydroxyethyl acrylate, hydroxyethyl methacrylate, hydroxypropyl methacrylate, etc.

For preparation of the graft polymer or the copolymer, there may be adopted any conventional polymerization procedure such as emulsion polymerization, suspension polymerization, bulk polymerization, solution polymerization, emulsion-suspension polymerization or bulk-suspension polymerization.

In the diene-rubber modified resin (B), the weight proportion of the graft polymer and the copolymer may be from 100:0 to 10:90, especially from 80:20 to 20:80. When the content of the copolymer exceeds the upper limit, a sufficient impact resistance is not obtainable.

The diene-rubber modified resin (B) is required to have melt viscosity characteristics as defined above. Namely, the diene-rubber modified resin (B) has apparent melt viscosities at 250° C. of $5 \times 10^3$ to $1 \times 10^5$ poise and of $1.5 \times 10^3$ to $1 \times 10^4$ respectively at shear rates of $10^2$ sec$^{-1}$ and of $10^3$ sec$^{-1}$. Preferably, the apparent melt viscosities are from $1 \times 10^4$ to $1 \times 10^5$ and from $3 \times 10^3$ to $1 \times 10^4$ respectively at shear rates of $10^2$ sec$^{-1}$ and $10^3$ sec$^{-1}$. When the diene-rubber modified resin has a higher apparent melt viscosity than the upper limit, the moldability of the ultimate thermoplastic resin composition is remarkably lowered, and the falling ball impact strength at the weld part is rather decreased.

When the diene-rubber modified resin has a lower apparent melt viscosity than the lower limit, the phase separation from the polycarbonate resin easily takes place at the injection molding with a high shear, and the falling ball impact strength at the weld part is remarkably decreased. The diene-rubber modified resin (B) having the desired melt viscosity characteristics can be readily produced by adoption of appropriate monomeric composition and appropriate polymerization conditions. Within the range of desired apparent melt viscosities at the said shear rates, the dependency of the viscosity on a shear rate is not important, yet smaller dependency is better.

The thermoplastic resin composition of the invention comprises the polycarbonate resin (A) and the diene-rubber modified resin (B) in a weight proportion of 20:80 to 80:20. When the amount of the polycarbonate resin (A) is smaller than the lower limit, the thermoplastic resin composition is inferior in heat resistance and moldability. When larger than the upper limit, improvement of the falling ball impact strength at the welt part is not produced, and the moldability is lowered.

For preparation of the thermoplastic resin composition of the invention, the said essential components, i.e. the polycarbonate resin (A) and the diene-rubber modified resin (B), may be mixed together in any optional order. Mixing may be achieved by the use of any conventional mixing apparatus such as a Banbury mixer, a monoaxial extruder or a biaxial extruder. If desired, any additive(s) such as dyestuffs, pigments, stabilizers, plasticizers, antistatic agents, ultraviolet absorbers, flame retardants, lubricants and fillers may be incorporated into the thermoplastic resin composition.

Practical and presently preferred embodiments of the invention are illustratively shown in the following Examples wherein % and part(s) are by weight unless otherwise indicated.

EXAMPLES 1 TO 3 AND COMPARATIVE EXAMPLES 1 TO 6

According to the prescription as shown in Table 1, the polycarbonate resin (A) and the diene-rubber modified resin (B) were mixed together to obtain a thermoplastic resin composition, of which the physical properties are also shown in Table 1.

The polycarbonate resin (A) and the diene-rubber modified resin (B) were prepared as set forth below:

Polycarbonate resin (A):

By varying the reaction temperature and time, a polycarbonate resin having a reduced viscosity at 25° C. in chloroform of 0.50 (A-1) (molecular weight, 28,000) and a polycarbonate resin having a reduced viscosity at 25° C. in chloroform of 0.30 (A-2) (molecular weight, 14,000) were prepared according to the conventional phosgene method.

diene-rubber modified resin (B):

By blending the graft polymer and the copolymer as shown below, there were prepared the diene-rubber modified resins having different melt viscosity characteristics.

Graft polymer (B-1)

A graft polymer (B-1) was prepared from polybutadiene (50 parts), styrene (36 parts) and acrylonitrile (14 parts) according to the conventional emulsion polymerization procedure.

Graft polymer (B-2)

A graft polymer (B-2) was prepared from polybutadiene (80 parts), styrene (14 parts) and acrylonitrile (6 parts) according to the conventional emulsion polymerization procedure.

Copolymer (B-1')

According to the conventional bulk-suspension polymerization using a molecular weight regulator, there was prepared a copolymer (B-1') comprising styrene (70 parts) and acrylonitrile (30 parts) and having an inherent viscosity at 30° C. in dimethylformamide of 0.44.

Copolymer (B-2')

According to the conventional bulk-suspension polymerization using a molecular weight regulator in an amount different from that in preparation of the copolymer (B-1'), there was prepared a copolymer (B-2') comprising styrene (70 parts) and acrylonitrile (30 parts) and having an inherent viscosity at 30° C. in dimethylformamide of 0.60.

Copolymer (B-3')

According to the conventional bulk-suspension polymerization using a molecular weight regulator in an amount different from those in preparation of the copolymers (B-1') and (B-2'), there was prepared a copolymer (B-3') comprising styrene (70 parts) and acrylonitrile (30 parts) and having an inherent viscosity at 30° C. in dimethylformamide of 1.25.

The falling ball impact strength at the weld portion was determined as follows:

A melt resin (260° C.) was injected through two gates (each being 2.5×20 mm) having a gate distance of 100 mm to make a test piece of 150 mm long, 150 mm wide and 3 mm high. The test piece was placed on a cylinder of 120 mm in inner diameter, 126 mm in outer diameter and 80 mm in height. A steel ball of 1 kg was dropped down onto the central part (the weld part) of the test piece in a room kept at −30° C., and the maximum energy (kg.cm) not breaking the test piece was measured.

The apparent melt viscosity and the shear rate were measured as follows:

The test resin was extruded through an orifice of 0.1 cm in nozzle diameter and 1.0 cm in nozzle length using a Koka type flow tester manufactured by Shimazu Seisakusho, and calculation was made according to the following equations:

$$\text{Shear rate} = 4Q/\pi R^3$$

$$\text{Apparent melt viscosity} = \pi R^4 P/8LQ$$

wherein Q is a flow amount (ml/sec), R is a nozzle radius (0.05 cm), L is a nozzle length (1.0 cm) and P is a pressure (dyn/cm$^2$).

TABLE 1

| Composition & Physical properties | Example | | | Comparative Test No. | | | | | |
|---|---|---|---|---|---|---|---|---|---|
| | 1 | 2 | 3 | 1 | 2 | 3 | 4 | 5 | 6 |
| Polycarbonate resin (A-1) (part(s)) | 60 | 60 | 55 | — | 50 | 60 | 60 | 60 | 10 |
| Polycarbonate resin (A-2) (part(s)) | — | — | — | 60 | — | — | — | — | — |
| ABS resin (B) (part(s)) | 40 | 40 | 45 | 40 | 50 | 40 | 40 | 40 | 90 |
| Graft polymer (B-1) (%) | 55 | 80 | 85 | 55 | 60 | 55 | — | 5 | 60 |
| Graft polymer (B-2) (%) | — | — | — | — | — | — | 60 | — | — |
| Copolymer (B-1') (%) | — | — | — | — | 40 | — | — | — | — |
| Copolymer (B-2') (%) | 45 | 20 | 15 | 45 | — | — | 40 | 95 | 40 |
| Copolymer (B-3') (%) | — | — | — | — | — | 45 | — | — | — |
| Apparent melt viscosity (poise) at 250° C. 10$^2$ sec.$^{-1}$ | 7 × 10$^3$ | 1.5 × 10$^4$ | 2 × 10$^4$ | 7 × 10$^3$ | 4 × 10$^4$ | 1.3 × 10$^5$ | 1.5 × 10$^5$ | 5.3 × 10$^3$ | 8 × 10$^3$ |
| at 250° C. 10$^3$ sec.$^{-1}$ | 1.8 × 10$^3$ | 6 × 10$^3$ | 6.3 × 10$^3$ | 1.8 × 10$^3$ | 1 × 10$^3$ | 1.4 × 10$^4$ | 1.5 × 10$^4$ | 1.6 × 10$^3$ | 2 × 10$^3$ |
| Falling ball impact strength at weld part (−30° C.) (kg.cm) | 200 | 200 | 200 | 40 | 45 | 40 | 35 | 10 | 10 |
| Notched Izod impact strength (20° C.) (kg.cm/cm$^2$) | 46.7 | 65.2 | 66.0 | 39.5 | 38.2 | 55.3 | 48.0 | 15.5 | 30.5 |
| Heat deformation temperature (no annealing) (°C.) | 105.0 | 103.3 | 100.2 | 101.0 | 102.0 | 101.0 | 98.5 | 104.6 | 88.3 |
| Moldability (Koka-type flow tester, 230° C. 60 kg/cm$^2$) (ml/min) | 0.60 | 0.25 | 0.23 | 0.70 | 0.80 | 0.05 | 0.03 | 0.70 | 0.30 |

What is claimed is:

1. A thermoplastic resin composition excellent in impact resistance and moldability and improved in falling ball impact strength at a weld part which comprises (A) a polycarbonate resin having a reduced viscosity at 25° C. in chloroform of 0.40 to 0.55 and (B) a diene-rubber modified resin comprising 10 to 100% by weight of a graft polymer of a diene-rubber chosen from polybutadiene, styrene/butadiene copolymer and butadiene-acrylonitrile copolymer, with an aromatic vinyl compound and at least one of a vinyl cyanide and an alkyl unsaturated carboxylate grafted thereon and 90 to 0% by weight of a copolymer of an aromatic vinyl compound with at least one of a vinyl cyanide and an alkyl unsaturated carboxylate, said diene-rubber modified resin having apparent melt viscosities at 250° C. of 5×10$^3$ to 1×10$^5$ poise at a shear rate of 10$^2$ sec$^{-1}$ and of 1.5×10$^3$ to 1×10$^4$ poise at a shear rate of 10$^3$ sec$^{-1}$, the weight proportion of the components (A) and (B) being from 20:80 to 80:20.

2. The thermoplastic resin composition according to claim 1, wherein the copolymer in the diene-rubber modified resin (B) is a copolymer of an aromatic vinyl compound and a vinyl cyanide having an inherent viscosity at 30° C. in dimethylformamide of 0.50 to 1.10.

* * * * *